(12) United States Patent
Ranson, Jr. et al.

(10) Patent No.: US 6,536,811 B1
(45) Date of Patent: Mar. 25, 2003

(54) PIPE COUPLING WITH ASSEMBLY TOOL

(75) Inventors: Robert A. Ranson, Jr., Richmond, VA (US); William C. Campbell, Richmond, VA (US)

(73) Assignee: Progressive Design, Inc., Richmond, VA (US)

( * ) Notice: Subject to any disclaimer, the term of this patent is extended or adjusted under 35 U.S.C. 154(b) by 110 days.

(21) Appl. No.: 09/662,871

(22) Filed: Sep. 15, 2000

(51) Int. Cl.$^7$ ................................................. F16L 23/00
(52) U.S. Cl. ...................... 285/364; 285/406; 285/408; 285/411; 285/421
(58) Field of Search ................................ 285/365, 364, 285/411, 406, 421, 408

(56) References Cited

U.S. PATENT DOCUMENTS

| | | | |
|---|---|---|---|
| 591,828 A | 10/1897 | Duncan | |
| 1,359,142 A | 11/1920 | Allison | |
| 1,949,055 A | 2/1934 | Lambie | |
| 2,014,313 A | * 9/1935 | Damsel | 285/408 X |
| 2,688,500 A | * 9/1954 | Scott | 285/364 X |
| 2,766,829 A | 10/1956 | Watts et al. | |
| 2,766,998 A | 10/1956 | Watts et al. | |
| 2,766,999 A | 10/1956 | Watts et al. | |
| 2,900,199 A | 8/1959 | Logan | |
| 3,181,901 A | 5/1965 | Watts | |
| 3,231,297 A | 1/1966 | Watts et al. | |
| 3,231,298 A | * 1/1966 | Tomb et al. | 285/421 X |
| 3,307,735 A | 3/1967 | Latham et al. | |
| 3,325,176 A | 6/1967 | Latham et al. | |
| 3,352,575 A | * 11/1967 | Daspit | 285/421 X |
| 3,403,931 A | 10/1968 | Crain et al. | |
| 3,404,902 A | * 10/1968 | Latham et al. | 285/364 X |
| 3,406,991 A | * 10/1968 | Decker, Jr. et al. | 285/408 |
| 3,451,697 A | * 6/1969 | Bula | 285/364 X |
| 4,159,132 A | * 6/1979 | Hitz | 285/421 X |
| 4,326,737 A | * 4/1982 | Lehmann | 285/365 X |
| 4,527,818 A | * 7/1985 | Rundell | 285/411 X |
| 4,640,530 A | * 2/1987 | Abbes et al. | 285/365 X |
| 4,909,548 A | 3/1990 | Welkey | |
| 4,921,284 A | 5/1990 | Singeetham | |
| 5,098,134 A | * 3/1992 | Monckton | 285/421 X |
| 5,131,632 A | 7/1992 | Olson | |
| 5,174,615 A | 12/1992 | Foster et al. | |
| 5,951,066 A | * 9/1999 | Lane et al. | 285/406 X |

FOREIGN PATENT DOCUMENTS

| | | |
|---|---|---|
| GB | 1133351 | 11/1968 |
| GB | 1 434 117 | 5/1976 |

* cited by examiner

*Primary Examiner*—Anthony Knight
*Assistant Examiner*—David E. Bochna
(74) *Attorney, Agent, or Firm*—Bacon & Thomas, PLLC (57) ABSTRACT

A pipe coupling includes mating hub sections engaged by outer split clamp elements that are compressed together against mating tapered surfaces of the hub sections to draw the hub sections together into tight fitting relationship. The clamp elements are driven into a compressed condition by an outer locking ring that fits over the split clamp elements to draw the hub sections together and to retain the hub sections against axial separation. The clamp elements have locking surfaces engageable by the locking ring and axial movement of the locking ring is limited by appropriate stop surfaces and retainers. A locking sleeve installation and removal tool utilizing an actuator system is described.

15 Claims, 4 Drawing Sheets

PIPE COUPLING WITH ASSEMBLY TOOL

GOVERNMENT RIGHTS

This invention was made with Government support under Contract No. N00024-00-C-4102 awarded by Naval Sea Systems Command. The Government has certain rights in the invention.

BACKGROUND OF THE INVENTION

1. Field of the Invention

This invention relates to pipe couplings.

2. Related Art

Flange type pipe couplings require a substantial amount of space surrounding the coupling and numerous bolted fasteners and various seals to prevent leakage between the flange members. Various non-flange couplings occupying a smaller envelope have been proposed and in particular various clamping arrangements providing a coupling as strong as a flange coupling but occupying less space and offering reliable service. U.S. Pat. No. 3,403,931 to Crain et al. granted Oct. 1, 1998 provides an example of a clamp type pipe coupling or fitting. In addition, U.S. Pat. No. 3,404,902 granted to Latham et al. on Oct. 8, 1968 shows a clamp fitting in combination with a seal arrangement between the terminal ends of hub elements intended to be joined to pipe ends to enable a union to be formed between the hub elements. The principle underlying the clamp type pipe connector is the application of an axial force between pipe coupling elements created by radially compressing a clamp member over tapered faces of hub elements that effectively drives the mating halves of the hub assembly together to form a tight seal that is maintained by the clamp. If the clamp and the hub are made entirely of metal along with a seal that may be introduced between the hub ends, the coupling is able to withstand high temperatures and is capable of resisting high stress loads.

Other prior art devices for enabling coupling of pipe ends have been devised using a sliding sleeve or locking ring fitting over a split coupling that engages the pipe ends to be joined together. The ring effectively locks the coupling elements against axial separation while the coupling elements are retained in intimate contact with the pipe ends by the locking sleeve. An example of this type of coupling is shown in U.S. Pat. No. 5,131,632, British Patent No. 1 434 117 published May 5, 1976 and British Patent No. 1 133 351 published Nov. 13, 1968. However, typical prior art locking ring type couplings require modifying the configuration of the pipe ends to be joined together by machining notches or retainer grooves in the pipe ends or have other disadvantages that limit their application.

BRIEF SUMMARY OF THE INVENTION

The present invention is a locking ring type coupling utilizing a pair of hub sections that are intended to be welded or otherwise permanently secured to the ends of pipe sections to be joined together by the coupling and wherein the hub sections include radially outwardly extending outer tapered surfaces that are engageable by surrounding annular split clamp elements that include inner tapered surfaces mating with the outer tapered surfaces of the hub sections. Driving the clamp elements radially inwardly draws the hub sections together in a tight union that resists bending loads and axial separation of the hub sections.

The clamp elements are radially compressed and locked together by an outer locking ring that may be manually installed or may be installed by means of a tool described herein. The use of the locking ring is facilitated by providing outer locking surfaces on the clamp elements that are relatively small in cross-section and which are provided with ramps that help guide the locking ring over the locking surfaces as the ring is placed in its operational position on the coupling. The locking ring, moreover, is provided with a motion stop surface that prevents advancement of the locking ring beyond a desired position and furthermore a retainer device may be provided to prevent unintentional motion of the locking ring in a direction tending to loosen the coupling. An internal metal seal may be provided that is clamped together with the mating hub sections when the coupling is fully assembled.

A tool for installing the locking ring includes an actuator that cooperates with coupling elements to drive the locking ring into position in a simple, convenient manner and also permits removal of the lock ring by using the same tool in a reverse position. The tool is configured so that it may be utilized with couplings of various diameters.

BRIEF DESCRIPTION OF THE DRAWINGS

With reference to the appended drawings illustrating preferred embodiments of the invention.

DETAILED DESCRIPTION OF PREFERRED EMBODIMENTS OF THE INVENTION

Figure 1:
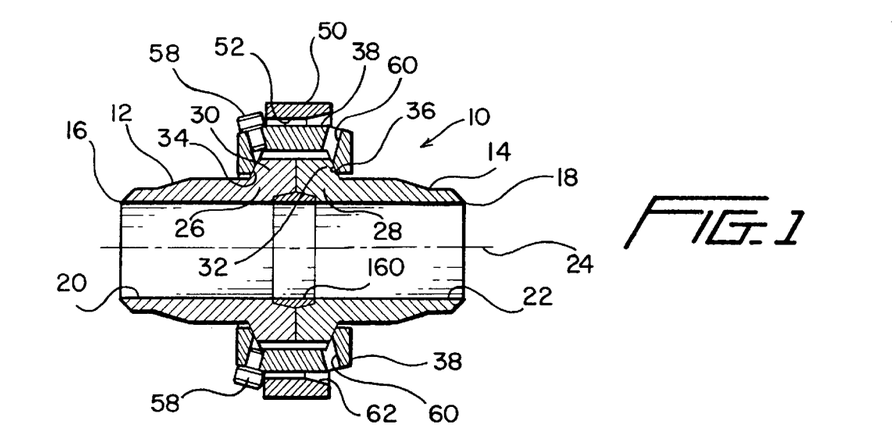
FIG. 1 is a section view of a pipe coupling constructed in accordance with a preferred embodiment of the invention taken along line I—I of FIG. 2.
Figure 2:
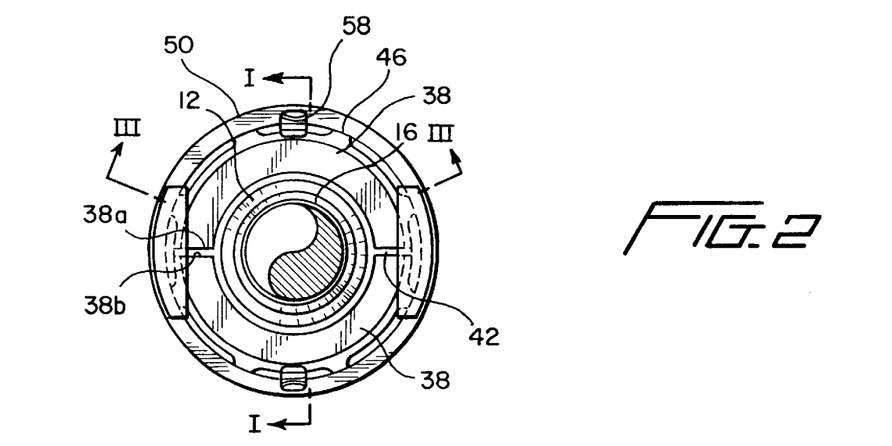
FIG. 2 is an end view of a pipe coupling constructed in accordance with a preferred embodiment of the invention.
Figure 3:
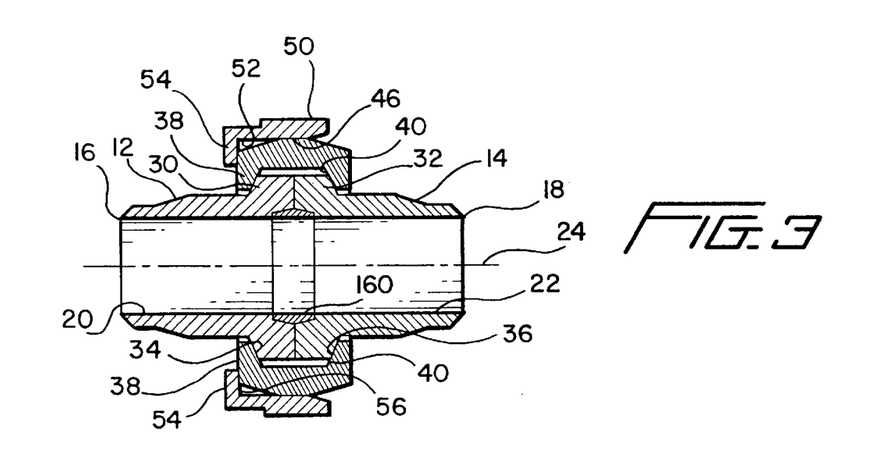
FIG. 3 is a section view taken approximately along line III—III of FIG. 2.

With reference to the appended drawings, and in particular with reference to FIGS. 1–3, a preferred embodiment of a pipe coupling 10 constructed in accordance with the invention includes first and second hub sections 12,14 in fully assembled relationship. Hub sections 12,14 include outer terminal ends 16,18, a longitudinal bore 20,22 that extends co-axially with longitudinal bore axis 24 of the coupling 10, Each hub section 12,14 includes an inner end 26,28 that includes a radially extending clamping portion 30,32, each of which includes a clamping face 34,36 that extends generally radially at an oblique angle between radially inner and outer ends of the clamping faces so that each clamping face is inclined toward the inner end of the respective hub section between it's radially inner and it's radially outer ends.

Figure 6:
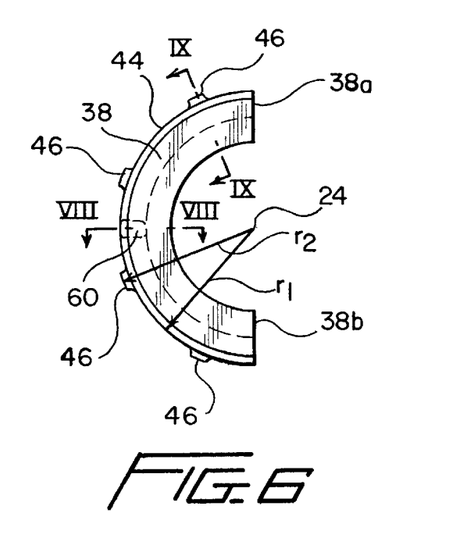
FIG. 6 is an end view of a preferred embodiment of a clamp element of the invention.
Figure 7:
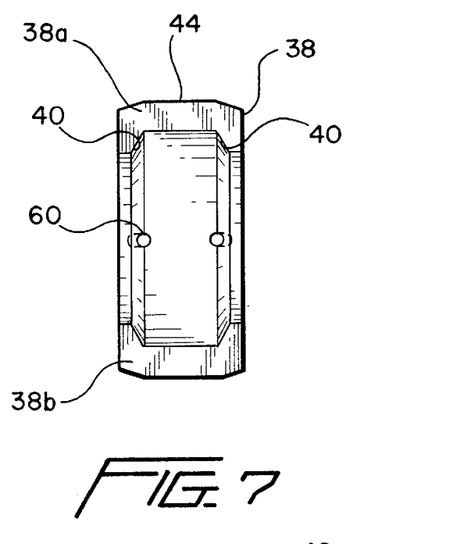
FIG. 7 is a side elevation view of the clamp element shown in FIG. 6.
Figure 8:
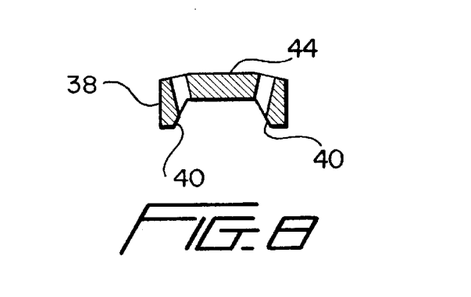
FIG. 8 is a section view taken along lines VIII—VIII of FIG. 6.

A pair of clamp elements 38 (shown in more detail in FIGS. 6–9) is disposed in close fitting relationship over the inner ends 26,28 of the hub sections 12,14 concentric with the bore axis 24. The clamp elements 38 each includes an annular inner profile that includes axially spaced, radially inwardly projecting inner clamping surfaces 40 (see FIG. 7) that mate with clamping faces 34,36 of the hub sections 12,14 when the hub sections are axially aligned and the inner ends 26,28 are in close proximity or abutting each other. The angle of inclination from a direction perpendicular to axis 24 of the clamping faces 34,36 and the clamping surfaces 40 may be, for example, on the order of 25°. It will be readily apparent that when the first and second hub sections 12,14 are placed in axially aligned positions with the inner ends thereof 26,28 in close proximity to each other and clamp elements 38 are fit in concentric relationship over the clamping portions 30,32 with the inner clamping surfaces 40 engaging the clamping faces 34,36, compression of the clamp elements 38 radially inwardly will cause the inner clamping surfaces 40 to compress the clamping faces 34,36 to thereby draw the hub section inner ends 26,28 together into abutting relationship as shown in FIG. 1. The clamp elements 38 are dimensioned and configured as generally circular segments as shown in FIG. 6 and furthermore are dimensioned such that when they have been placed in assembled relationship about the inner ends 26,28 of hub sections 12,14 with the inner ends abutting each other, a clearance gap 42 (see FIG. 2) remains between the opposed ends 38a,38b of the clamp elements 38. It will also be evident from viewing FIGS. 1 and 3 that the outer ends of clamping portions 30,32 of hub sections 12,14 do not penetrate completely within the inner periphery of clamp elements 38 when the pipe coupling is in fully assembled condition as shown in FIG. 1.

The clamp elements 38 are each configured to have an outer peripheral surface portion 44 disposed at or within a first radius of curvature $r_1$ centered on bore axis 24 and a plurality of circumferentially spaced locking surface portions 46 lying outside said first radius of curvature $r_1$ and located along a second radius of curvature $r_2$ centered on axis 24 that is greater than the first radius of curvature $r_1$.

Figure 9:
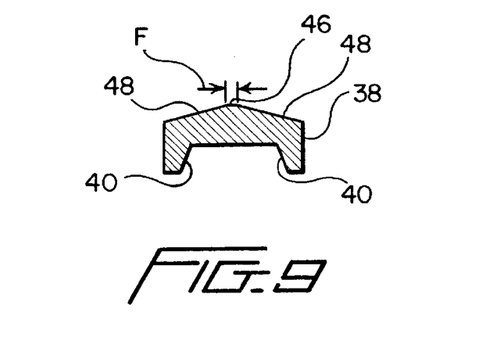
FIG. 9 is a section view taken along IX—IX of FIG. 6.

As shown in FIG. 9, the locking surface portions 46 are each defined by a flattened area F located at the intersection of opposed radially and axially extending sloping outer peripheral surface portions 48 that are integral with the clamp elements 38 and extend gradually radially outwardly as they approach the central area of the clamp elements 38 to provide ramp surfaces for guiding a locking ring of the pipe coupling (to be described below). The flattened area F defining the locking surface portion 46 may be, for example, on the order of 0.125" (3.18 mm) in accordance with a preferred embodiment of the invention. The flattened area F, as illustrated, extends parallel to bore axis 24 when the clamp elements 38 are fitted over the inner ends 26,28 of hub sections 12,14. While a pair of radially and axially extending sloping surfaces 48 are illustrated in accordance with the preferred embodiment, it will be understood that only a single radially and axially extending sloping surface 48 could be utilized on one side of the flattened areas F defining the locking surface portion 46 to provide a ramping surface for a locking ring to be utilized in the pipe coupling according to the invention. However, the use of a pair of surfaces 48 enables the clamp elements 38 to be fully reversible so that they can each be installed over the hub sections in a universal manner.

Figure 4:
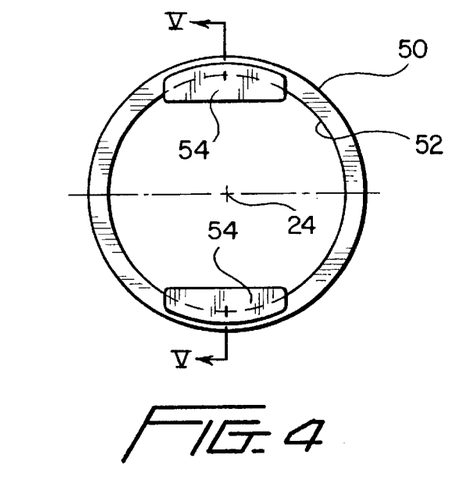
FIG. 4 is an end view of a preferred embodiment of a locking ring of the invention.
Figure 5:
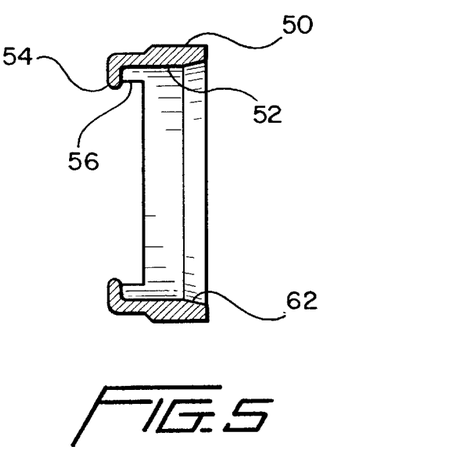
FIG. 5 is a section view taken along line V—V of FIG. 4.

An annular locking ring 50 having an annular inner locking surface portion 52 (see FIGS. 4 and 5) inside the ring is installed over the outer periphery of the clamp elements 38 so as to engage the locking surface portions 46 of the clamp elements 38. The inner diameter of the inner locking surface 52 is unthreaded, is relatively smooth and has a radius of curvature not exceeding $r_2$ defining the boundary of the locking surface portions 46 when the clamp elements 38 are fit over the inner ends 26,28 of the hub portions 12,14 with the clamping surfaces 40 in abutting relationship with clamp faces 34,36 and with the inner ends 30,32 of the hub sections 12,14 abutting each other in axial alignment, as shown in FIGS. 1 and 3. Preferably, the inner diameter of the locking surface 52 is dimensioned to provide a residual compression force on clamp elements 38 through the locking surface portions 46 in the final assembled configuration of the pipe coupling, which is reacted by a residual hoop tension in the locking ring 50. In such relationship, the locking ring 50 maintains the ends 30,32 in abutting relationship in a pre-stressed condition and resists axial separation of the hub sections 12,14.

The locking ring 50 includes a radially projecting motion stop portion 54 including a radially extending stop surface 56 that extends radially inwardly inside the axially projected diameter of inner locking surface portion 52 and engages a radially extending surface of a clamp element 38 when the ring 50 reaches a desired axial position along the clamp elements 38, as illustrated in FIG. 3. The motion stop portion 54 extends axially beyond the length of the main portion of ring 50 and the stop surface 56 prevents movement in the direction of installation of the locking ring 50, which direction is from left to right as shown in FIGS. 1 and 3. To prevent axial movement of locking ring 50 in the reverse or removal direction, removable retainer elements 58 in the form of threaded cap screws or the equivalent may be placed in a threaded bore 60 of clamp element 38 with the retainer elements 58 located such that the retainer elements 58 prevent axial movement of locking ring 50 in a locking ring removal direction. A pair of axially spaced threaded bores 60 are provided on each clamp element 38 to enable the clamp elements to be installed in reversible orientations over the inner ends 26,28 of the hub sections 12,14. It will be apparent that retainer elements 58 need be provided only on one side of the clamp elements 38 to prevent unintentional axial movement of locking ring 50 in a releasing direction. Thus, a motion stop 54 and its associated stop surface 56 functions in a cooperative manner with the retainer elements 58 to prevent axial movement of locking ring 50 in an axial direction in the fully assemble pipe coupling as illustrated in FIGS. 1 and 3.

Figures 10, 11, 12:
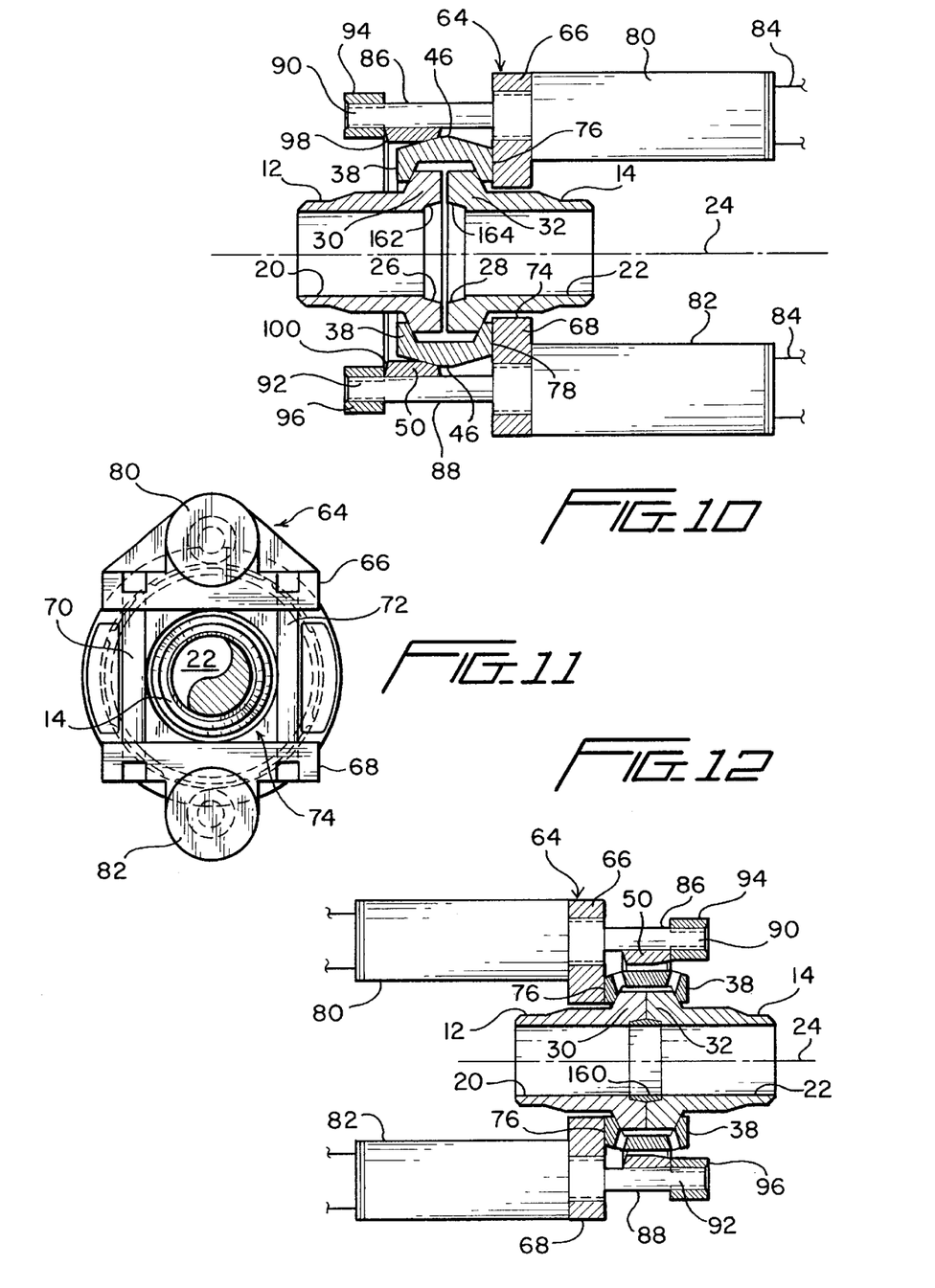
FIG. 10 is a side view of the pipe coupling of the invention with a locking ring installing and removing tool according to the invention mounted thereon in a locking ring installing position.
FIG. 11 is a right side end view of FIG. 10.
FIG. 12 shows the installing and removing tool in a locking ring removing position.
Figure 13:
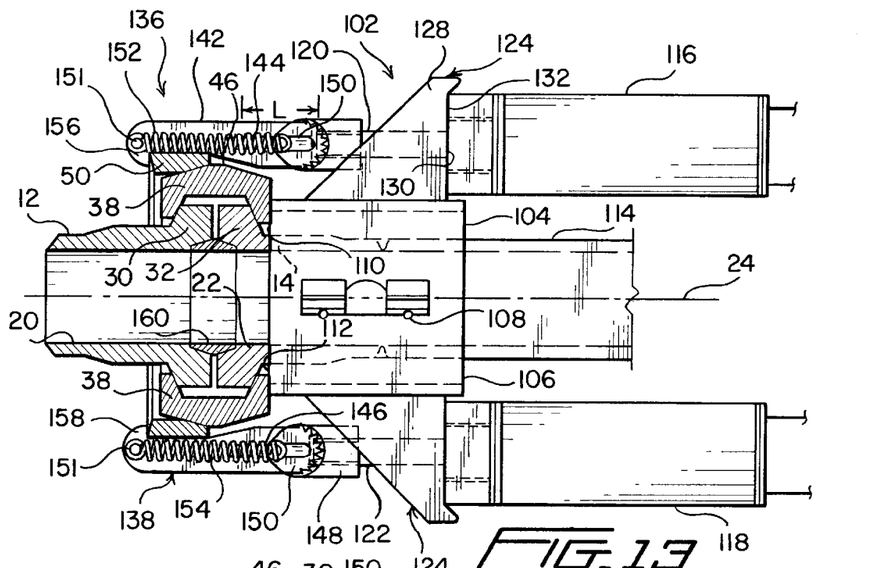
FIG. 13 is a side view showing another embodiment of locking ring installing and removing tool mounted on the pipe coupling constructed in accordance with the invention.

The locking ring 50 includes a radially diverging (tapered inclined inner peripheral ramp surface 62 at one axial end area of the locking ring 50, the ramp surface 62 intersecting the inner locking surface 52 so that during assembly of the locking ring 50 over the clamp elements 38, the ramp surface 62 will engage one set of sloping surfaces 48 approaching locking surface portions 46, as shown in FIGS. 10 and 13, for example. The inclination of the sloping ramp surface 62 preferably corresponds to the degree of slope of sloping surfaces 48 so that a cam and follower effect is obtained between the ramp surface 62 and the sloping surface 48 during installation of the locking ring 50 over the clamp elements 38. It will be apparent that the cam and follower effect causes radially inward movement of the clamp elements 38 towards the bore axis 24 which in turn drives the ends 26,28 of the hub sections 12,14 axially towards each other because of the sloping relationship between the clamping faces 34,36 of the inner ends 26,28 and the inner clamping surfaces 40 of the clamp elements 38.

Installation of the locking ring 50 over the clamp elements 38 is facilitated by the cooperation of the ramp surface 62 and the sloping surface 48 and the total force required to fit locking ring 50 over the clamp elements 38 is reduced by reducing the contact surface area of the locking surface portions 46 relative to the total axial lengths of the clamping elements 38, in particular the length of inner locking surface 52.

Installation and removal of the locking ring 50 may be accomplished manually by hand tools arranged to slide the locking ring 50 around the clamping elements 38 in an axial direction. However, for larger pipe couplings it has been found desirable to utilize actuators for installing and removing the locking ring 50. One embodiment of a locking ring installing and removing tool in accordance with the present invention is illustrated in FIGS. 10–12, wherein a bracket 64 comprising opposed bracket sections 66,68 are connected by preferably separable rigid links 70,72 in spaced apart relationship so as to define a central open area 74 that is dimensioned to receive one end area of a hub section 14 extending away from its respective inner end 28. The bracket sections 66,68 include radially extending surfaces 76,78 that may be placed in abutting relationship with a radially extending surface of the clamp elements 38 at one axially end of the clamp elements. Actuators 80,82 are attached to or placed in engagement with the bracket element 66,68 on the side thereof opposite the radially extending faces 76,78 and are provided with appropriate sources of energization via conduits or lines 84. The actuators 80,82, for example, may be energized hydraulically, pneumatically or electrically, the specific energization source not constituting a portion of the present invention. Any form of energization that can be implemented in accordance with the knowledge of those skilled in the art may be utilized to drive the actuators 80,82, including a manually operable actuator that provides a mechanical advantage.

Each actuator 80,82 includes an axially moveable actuator rod 86,88 that extends through or at least beyond a respective bracket section 66,68 and includes a distal end 90,92 that is connected to a locking ring engaging feature 94,96 that may be constituted of individual engaging elements attached to each distal end of an actuator rod 86,88 or that, for example, could be constituted of a single locking ring engaging member that may be secured to the actuator rods 86,88.

The locking ring engaging feature 94,96 is rigidly attached to a respective locking rod 86,88 for axial movement therewith and includes a radially projecting locking ring engaging surface 98,100 that extends radially inwardly relative to the distal ends 90,92 of actuator rods 86,88 to a sufficient extent that one axial end of the locking ring 50 may be engaged by the locking ring engaging surface when the bracket 64 is mounted over the hub section 14 with the radial face 76,78 abutting the clamp elements 38 with the actuator rods 86,88 extended axially as illustrated in FIG. 10.

In operation, energization of the actuators 80,82 in a manner causing axial retraction movement of the actuator rods 86,88 towards the actuators 80,82 will cause the locking ring engaging surfaces 98,100 to engage the locking ring 50 and will pull the locking ring 50 over the outer locking surface portions 46 of clamping elements 38 to thereby cause radially inward movement of the clamping elements 38 which will cause the inner ends 26,28 of hub sections 12,14 to be drawn axially together into abutting relationship via the clamping surfaces 40 and clamping faces 34,36 as described above.

It will be evident from viewing FIG. 10 (wherein the seal 160 is omitted for clarity) that the locking ring 50 is initially placed in contact with sloping surfaces 48 of the clamp elements 38 due to the fact that the clamp elements 38 are disposed in somewhat radially outwardly located positions due to the fact that the inner ends 26,28 of hub sections 12,14 have not yet been drawn into abutting relationship. Thus, while the inner clamping surfaces 40 are in engagement with clamping faces 34,36, the clamp elements 38 are nevertheless located radially outwardly relative to their final assembled positions at which the inner ends 26,28 of hub sections 12,14 are drawn together in abutting relationship.

Upon location of the locking ring 50 at a desired assembled position as illustrated in FIG. 3, the actuator rods 86,88 may be disengaged from the locking ring 50 and the bracket 64 may be removed from the assembly by an appropriate procedure, that may include disassembly of the bracket 64 and the links 70,72 if necessary.

Removal of locking ring 50 by utilizing actuators 80,82 may be accomplished in the manner illustrated in FIG. 12 simply by reversing the position of the bracket 64 so that the opposite end of the locking ring 50 may be engaged by the locking ring engaging features 94,96. Inward motion or retraction of the actuator rods 86,88 causes axial motion of the locking ring 50 in a removal direction towards bracket 64.

Figures 14, 15:
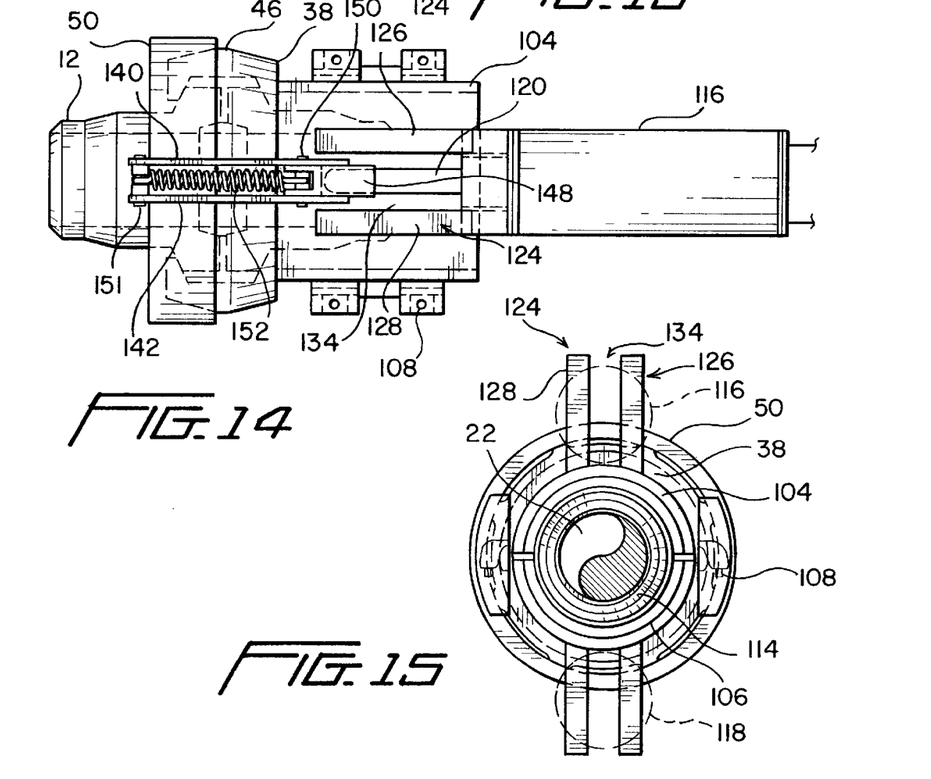
FIG. 14 is a top plan view of FIG. 13.
FIG. 15 is a right side end view of FIG. 13.

FIGS. 13,14 and 15 illustrate a preferred embodiment of locking ring installing and removing tool that utilizes the same principles as described previously in connection with the embodiment of the tool illustrated in FIGS. 10–12, while facilitating quick assembly and disassembly of the tool relative to a locking ring 50 to be installed or removed onto or from a pipe coupling.

In accordance with the embodiment of the locking ring installing and removing tool shown in FIG. 13, the tool includes a bracket 102 including a split central body comprising central body halves 104,106 that may be connected together by quick disconnect fasteners 108 to surround a hub section 14 in the manner illustrated in FIGS. 13,14 and 15. Central body halves 104,106 include radially extending surfaces 110,112 that, in operation, are placed in abutting relationship with axial end surfaces of clamp elements 38 that have been previously located over the inner ends 26,28 of hub sections 12,14, as illustrated. In FIG. 13, a section of a pipe or tubular conduit 114 has been illustrated to show the relationship of the bracket 102 relative to the hub section 12,14 when a hub section 14 has been butt welded to the end of a pipe 114 in a typical application of the pipe coupling.

Actuators 116,118 having axially moveable actuator rods 120,122 preferably are located on opposite sides of the bore axis 24, as shown in FIGS. 10 and 13.

Radially extending actuator rod guides 124 each includes circumferentially spaced, radially extending guide walls 126,128 associated with each bracket half 104,106, each guide wall 126,128 including a radially extending load reacting surface 130 against which an axial end 132 of actuators 116,118 may be abutted, as shown. The guide walls 126,128 are spaced apart so as to define an actuator rod receiving channel 134 that extends radially between the walls 126,128 and is open throughout it's length so as to permit radial and axial entry and exit of actuator rods 120,122 without interference. Thus, each actuator 116,118 may be readily radially moved to radially remove actuator rods 120,122 from channels 134 in any desired manner, including simple manipulation.

In the embodiment of the locking ring installing and removing tool illustrated in FIGS. 13–15, the locking ring engaging feature includes a lost motion device 136,138 connected to the distal end of each actuator rod 120,122. Each lost motion device 136,138 includes a pair of laterally spaced tension links 140,142 having longitudinally extending slots 144,146. Each slot 144, for example, may have a length L as shown in FIG. 13. Each actuator rod 120,122 includes a coupling 148 that extends between tension links 140,142 that is connected to the tension links by means of transverse pin 150 that extends through respective axial slots 144,146 in the tension links 140,142.

A spring biasing device such as a coil springs 152,154 anchored at one end to the tension links 140,142 by pin 151 and connected at their other end to pins 150 biases the lost motion device 136,138 normally towards the distal ends of actuator rods 120,122 or towards actuators 116,118. The length L of slots 144,146 is selected so that upon initial retraction or inward movement of actuator rods 120,122, the transverse pins 150 will engage the end of the slots 144,146 most closely adjacent the actuator rods 120,122 to thereby limit the extent of relative motion between the lost motion device 136,138 and the actuator rods 120,122 in an axial direction away from the actuator rods 120,122.

The lost motion devices 136,138 include generally radially extending locking ring engaging features 156,158 that may be fitted over locking ring 50 and in engagement with one axial end of the locking ring 50 at evenly circumferentially spaced positions about bore axis 24.

The above arrangement permits the assembly of an actuator 116, an actuator rod 120 and a lost motion device 136,138 to be manipulated into a position such that the locking ring engaging feature 156 may be engaged against the axial end of a locking ring 50 that has been placed in position over clamp elements 38 in the manner illustrated in FIG. 13 and then the actuator rod 120 (with its associated actuator) may be axially pulled in a direction extending away from the tension links 140,142 by sliding the pin 150 in slots 144,146 to permit the actuator 116 to be moved over and around the outer ends of guide walls 126,128 with the actuator rods 120,122 moved radially and axially between guide walls 126,128 into the channel 134 wherein the actuator rods 120,122 are freely axially moveable under the influence of the actuators 116,118.

In the final assembled position of the locking ring installing and removing tool, the leftmost axial ends 132 of actuators 116,118 are placed into abutting relationship with the force reacting wall 130 of guide walls 126,128 with the locking ring engaging features 156 in engagement with the axial end of locking ring 50.

In this position, the actuators 116,118 may be operated to retract actuator rods 120,122 inwardly towards the actuators 116,118 to thereby bottom the pins 150 in the slots 144,146 which will then permit transfer of tension load through the tension links 140,142 to the locking ring engaging feature 156 to thereby drive the locking ring 50 axially over the locking surface portions 46 of the clamp elements 38. Removal of the locking ring 50 involves simply reversing the position of the bracket 102 and pulling the locking ring 50 away from the clamping elements 38 in the reverse direction in the manner as explained above in connection with the embodiment of the locking ring installing and removing tool shown in FIG. 12.

In a preferred embodiment of the invention, all components of the pipe coupling are made of metal to provide a high strength coupling capable of withstanding elevated temperatures and axial, torsional and bending loads. The elements, however, may be formed of, for example, various types of steel, including stainless steel, or other metals meeting the requirements of the pipe coupling, as well as plastic and composite materials known to those skilled in the art as suitable for use in pipe coupling applications.

In typical installations, an inner seal 160 made of a material compatible with the coupling, including metal, as shown in FIG. 12, is installed between the inner ends 26,28 of the hub sections 12,14. To accommodate the seal 160, inner axially extending, radially diverging seal seat surfaces 162 (see for example FIG. 10) are provided, the seats being configured and dimensioned to receive the outer peripheral geometric shape of the seal 160 in a manner well known to those skilled in the art. The seal seats, as illustrated, intersect the bores 20,22. In the final assembled position of the seal as illustrated in FIG. 12, the seal tightly fits against the seal seats preferably in a tightly compressed condition to prevent leakage between the adjacent inner ends 26,28 of the hub sections 12,14. The seal 160, like the remaining components of the coupling, may be formed of steel or other appropriate metal capable of accommodating the interference loads imposed thereon when installed between mating hub sections.

While the invention has been disclosed by illustrating specific preferred embodiments thereof, it is to be understood that modifications of the embodiments can be made without departing from the spirit and scope of the invention, which extends to the full scope of the appended claims. For example, and not by way of limitation, the retainers 58 for securing the locking ring 50 could be configured as clips or other types of fasteners that could be secured in place either on the locking ring 50 or the clamp elements 38 in a manner that will secure the locking ring 50 against removal from clamp elements 38. The seal 160 could be configured in any appropriate manner to effect sealing between the inner ends 26,28 of hub sections 12,14. The seal 160 may be formed of any material that is appropriate for a seal element in the environment in which the coupling is to be used. The ramp surface or surfaces could be different than the flat surfaces illustrated to guide the locking ring 50 to its final assembled position. While most of the elements have been constructed to be fully interchangeable and reversible, it is to be understood that the elements could be configured as mirror images, if desired. While a pair of actuators 80,82 and 116,118 have been illustrated in accordance with the preferred embodiment of the invention, more actuators could be utilized that are evenly spaced circumferentially about the axis 24 to provide sufficient force to slide the locking ring 50 over the clamp elements 38. Moreover, the guides 124 could be configured in any appropriate manner that would enable the actuators and their associated actuator rods to be simply and conveniently moved into position after a lost motion device is engaged by the locking ring 50. The lost motion device 136,138 could be configured in any appropriate manner that would function essentially in an equivalent manner as the lost motion devices 136,138 illustrated. The connections between the actuator rods 120,122 and the lost motion devices 136,138 could be substituted by any appropriate connection that would meet the operation requirements of the locking ring installation tool illustrated.

We claim:

1. A pipe coupling comprising:

first and second hub sections each having a longitudinal bore extending along a longitudinal axis, an outer terminal end and an inner end having a circumferentially and radially extending clamping portion including a clamping face extending concentric with the bore at an oblique angle between radially inner and outer ends of the clamping face so that the clamping face is inclined towards the inner end of the respective hub section between its radially inner and radially outer ends;

at least a pair of clamp elements configured as generally complementary segments each having an annular inner profile concentric with the bore including axially spaced radially inwardly projecting inner clamping surfaces dimensioned and configured to fit closely over and mate with the clamping faces of the first and second hub sections when the inner ends of the first and second hub sections are axially aligned and placed in close proximity to each other, and an outer circumferentially extending peripheral surface portion lying within a first radius of curvature, and a plurality of circumferentially spaced locking surface portions lying outside said first radius of curvature and along a second radius of curvature greater than said first radius of curvature and concentric with said bore;

said clamp elements having terminal ends and being dimensioned so said ends are located adjacent each other but not abutting each other when said clamping surfaces of said clamp elements are mated against said clamp faces and the inner ends of the hub sections abut each other;

a locking ring having an inner locking surface extending concentric with said bore and having a radius of curvature that is not larger than the radius of curvature of said locking surface portions when said clamp elements are fit over the inner ends of the hub portions with the clamping surfaces and clamp faces in abutting relationship and with said inner ends of said hub sections abutting each other;

whereby placement of said clamp elements over the inner ends of the hub sections with the clamp faces in abutting relationship with the clamp surfaces and placement of said inner locking surfaces of said locking ring over the locking surface portions of the clamp elements draws the inner ends of the hub sections in abutting relationship and resists axial separation of said hub sections.

2. The pipe coupling as claimed in claim 1, wherein said locking surface portions are each defined by an area located at the end of at least one radially and axially extending sloping outer peripheral surface portion of said clamp element.

3. The pipe coupling as claimed in claim 1, including at least one selectively removable retainer element associated with at least one clamp element arranged to prevent axial movement of the locking ring relative to said last-recited clamp element in an axial direction.

4. The pipe coupling as claimed in claim 1, said locking ring including a radially extending motion stop surface at one end area of said locking ring, said stop surface located and dimensioned to engage a clamp element for preventing relative axial movement between the locking ring and the clamp element in one axial direction that is opposite an axial direction of fitting the locking ring over the clamp elements.

5. The pipe coupling as claimed in claim 1, said locking ring including a radially extending motion stop surface at one end area of said locking ring, said stop surface located and dimensioned to engage a clamp element for preventing relative axial movement between the locking ring and the clamp element in one axial direction that corresponds to an axial direction of fitting the locking ring over the clamp elements; and at least one selectively removable retainer element associated with at least one clamp element arranged to prevent axial movement of the locking ring relative to said last-recited clamp element in an axial direction that is opposite an axial direction of fitting the locking ring over the clamp elements.

6. The pipe coupling as claimed in claim 1, said locking ring including a radially diverging inclined inner peripheral ramp surface at one axial end area thereof, said ramp surface intersecting said inner locking surface.

7. The pipe coupling as claimed in claim 1, said locking ring including a radially diverging inclined inner peripheral ramp surface at one axial end area thereof, said ramp surface intersecting said inner locking surface;

said locking ring including a radially extending motion stop surface at one end area of said locking ring, said stop surface located at the axial end of said locking ring opposite the axial end having the ramp surface and dimensioned to engage a clamp element for preventing relative axial movement between the locking ring and the clamp element in one axial direction that corresponds to an axial direction of fitting the locking ring over the clamp elements.

8. The pipe coupling as claimed in claim 7, including at least one selectively removable retainer element associated with at least one clamp element arranged to prevent axial movement of the locking ring relative to said last-recited clamp element in an axial direction that is opposite an axial direction of fitting the locking ring over the clamp elements.

9. The pipe coupling as claimed in claim 1, wherein said hub sections, clamp elements and locking ring are metal.

10. The pipe coupling as claimed in claim 9, said first and second hub sections each including an inner, radially diverging surface defining a seal seat at the inner end thereof and intersecting said bore; and an annular seal element dimensioned and configured to span the inner ends of such hub sections in contiguous and compressed relationship with said seal seats when the inner ends of the hub portions are in abutting, axially aligned relationship.

11. A locking ring for use in a clamp type pipe coupling, said ring comprising an annular inner surface including an unthreaded locking surface portion centered on a ring axis of curvature;

an inwardly radially extending motion stop surface at one axial end area of the ring extending inwardly of an axially projected diameter of the inner locking surface; and a radially diverging inclined inner peripheral ramp surface at a second axial end of the ring, said ramp surface intersecting said annular inner surface.

12. The locking ring as claimed in claim 11, said locking ring having a main portion having an axial length along said axis of curvature, said motion stop surface connected to an axially projecting portion of said locking ring that extends axially beyond said main portion.

13. A clamp element for use in a clamp type pipe coupling, said clamp element generally shaped as a circular segment centered on an axis of curvature, and including an annular inner profile concentric with said axis of curvature including axially spaced radially inwardly projecting inner clamping surfaces extending at an oblique angle between radially outer and radially inner ends of the clamping surfaces, the surfaces tapering inwardly towards each other as they approach radially outer ends thereof in a direction away from said axis of curvature; and     an outer circumferentially extending peripheral surface portion lying within a first radius of curvature centered on said axis of curvature concentric with said axis of curvature, and a plurality of circumferentially spaced locking surface portions lying outside said first radius of curvature and along a second radius of curvature greater than said first radius of curvature and concentric with said axis of curvature.

14. The clamp element as claimed in claim 13, said locking surface portions each being defined by an area located at an end of at least one radially and axially extending sloping outer peripheral surface portion of said clamp element.

15. The clamp element as claimed in claim 14, wherein said locking surface portions are defined by an area located between a pair of radially and axially extending sloping outer peripheral surface portions of said clamp element.

\* \* \* \* \*